US012433486B2

(12) United States Patent
Sen et al.

(10) Patent No.: US 12,433,486 B2
(45) Date of Patent: Oct. 7, 2025

(54) DISTRIBUTED BODY AREA NETWORK COMPUTING SYSTEM, METHOD, AND COMPUTER PROGRAM PRODUCTS

(71) Applicant: Quasistatics Inc., West Lafayette, IN (US)

(72) Inventors: Shreyas Sen, West Lafayette, IN (US); Angik Sarkar, Seattle, WA (US)

(73) Assignee: Quasistatics Inc., West Lafayette, IN (US)

( * ) Notice: Subject to any disclaimer, the term of this patent is extended or adjusted under 35 U.S.C. 154(b) by 56 days.

(21) Appl. No.: 18/591,043

(22) Filed: Feb. 29, 2024

(65) Prior Publication Data
US 2024/0197180 A1    Jun. 20, 2024

Related U.S. Application Data

(63) Continuation-in-part of application No. 17/658,622, filed on Apr. 8, 2022, now abandoned.

(51) Int. Cl.
*A61B 5/00* (2006.01)
*A61B 5/01* (2006.01)
(Continued)

(52) U.S. Cl.
CPC ............ *A61B 5/0024* (2013.01); *A61B 5/002* (2013.01); *A61B 5/0022* (2013.01); *A61B 5/0077* (2013.01); *A61B 5/01* (2013.01); *A61B 5/0245* (2013.01); *A61B 5/14546* (2013.01); *A61B 5/296* (2021.01); *A61B 5/4519* (2013.01); *A61B 5/6803* (2013.01); *A61B 5/7405* (2013.01);
(Continued)

(58) Field of Classification Search
CPC .............................. A61B 5/0024; A61B 5/296
See application file for complete search history.

(56) References Cited

U.S. PATENT DOCUMENTS 10,078,917 B1    9/2018   Gaeta et al.
10,816,807 B2 *  10/2020  Polcak ............... G02B 27/0955
(Continued)

FOREIGN PATENT DOCUMENTS

WO        2018158347 A1     9/2018

*Primary Examiner* — David Bilodeau
(74) *Attorney, Agent, or Firm* — Kevin J Fournier IP Legal Services Ltd.; Kevin J Fournier

(57) ABSTRACT

The present disclosure provides a distributed body area network (BAN) computing system, method, and computer program product. The wearable device includes a plurality of sensors configured to generate sensory data and generate a data packet appended with the sensory data. The sensory data includes user behavioral and physiological parameters, health parameters of a user, ambient parameters, and environmental data. Further, the wearable device transmits the data packet to at least one computing device via a secure communication network. The transmission of the data packet between the wearable device and the computing device corresponds to human body communication (HBC). The computing device transmits a data model appended with one or more instructions to the wearable device via the secure communication network. The wearable device executes one or more instructions to at least render the sensory data for visualization to the user, and provide a stimulation to the user.

20 Claims, 5 Drawing Sheets

(51) Int. Cl.
*A61B 5/0245* (2006.01)
*A61B 5/145* (2006.01)
*A61B 5/296* (2021.01)

(52) U.S. Cl.
CPC .... *A61B 5/7455* (2013.01); *A61B 2560/0242* (2013.01); *A61B 2560/045* (2013.01)

(56) References Cited

U.S. PATENT DOCUMENTS

| | | | |
|---|---|---|---|
| 11,190,753 B1* | 11/2021 | Meier | G06T 19/006 |
| 2009/0219863 A1* | 9/2009 | Sen | H04B 17/382 |
| | | | 370/329 |
| 2016/0378427 A1* | 12/2016 | Sharma | G10L 19/0212 |
| | | | 700/94 |
| 2017/0238129 A1* | 8/2017 | Maier | H04W 4/14 |
| | | | 455/404.2 |
| 2018/0288586 A1* | 10/2018 | Tran | B33Y 10/00 |
| 2019/0129181 A1* | 5/2019 | Polcak | G02B 27/0093 |
| 2019/0245947 A1* | 8/2019 | Ishii | H04L 69/03 |
| 2021/0223864 A1* | 7/2021 | Forsland | G06F 1/163 |
| 2021/0369173 A1* | 12/2021 | Ghose | A61B 5/0006 |
| 2022/0255637 A1* | 8/2022 | Zoss | A61B 5/0031 |
| 2022/0331047 A1* | 10/2022 | Shelton, IV | G06T 7/70 |
| 2024/0188876 A1* | 6/2024 | Ghose | A61B 5/335 |

* cited by examiner

DISTRIBUTED BODY AREA NETWORK COMPUTING SYSTEM, METHOD, AND COMPUTER PROGRAM PRODUCTS

TECHNICAL FIELD

The present invention relates to communication interfaces, and more particularly relates to a distributed body area network (BAN) based system, and method for capturing and processing data signals (e.g., bio-signals) and rendering various feedback signals to a user.

BACKGROUND

In recent times, there are numerous wireless devices available in markets for capturing various sensory signals of a user's body. Some examples of the wireless devices may include wireless earbuds, smartwatches, smartphones, and virtual-reality headsets. The wireless devices usually record sensor data related to the user to at least one computing device for at least visualization of the sensor data or provide any sensory feedback to the user. Further, due to technological advancement, there has been research for developing smart contact lenses that display information and digital pills that transmit sensor data after being swallowed. However, there is a delay in receiving feedback and there is a requirement for another individual to analyze the sensory data. Moreover, the aforementioned devices are required to transmit data securely using short range communication protocols at low power. Hence, such individual components of a single human-size wireless network may be referred to as Internet of Bodies (IoB).

Further, the IoB devices use established wireless technologies (e.g., Bluetooth) for communication between the user and the aforementioned wireless devices. The existing wireless technologies (such as Bluetooth) enable the ease of communication between two devices within a set distance range. While these technologies utilize low-power signals for communication and are easy to implement, they exhibit insignificant results for IoB networks hence they are undesirable for the IoB networks. For example, these technologies require data to be compressed before transmission and then transmit the compressed data. Moreover, most of the IoB devices run out of battery while streaming data content such as video, and hence cannot be used for a prolonged duration, and the quality of the content delivered will be low due to latency issues. Also, the existing wireless technologies are prone to man-in-the-middle (MitM) attacks thus allowing any hypothetical attacker to snoop on or attack the devices on someone's body. Moreover, other wireless technologies have been designed to transmit data through air or vacuum, and not through the medium of the human body, hence they are less efficient. Additionally, the existing wearable devices perform computation of data within themselves, which requires huge computational power. Furthermore, there are several implementations for data transmission.

In one example scenario, a method of communication for enabling secure communication between medical devices, wearables, and any other devices on or using low-power wireless network is disclosed. The system capitalizes on the human body's innate ability to conduct tiny, harmless electrical signals to turn the entire body into a wired communication channel.

In another example scenario, a method of rendering a first view of a three-dimensional virtual scene is disclosed. The three-dimensional virtual scene includes a view of the first content being displayed on a virtual display device from a location in the three-dimensional virtual scene. The method further includes rendering a second view of one or more content objects.

In yet another example scenario, a virtual or augmented reality (AR) device that includes two lens groups for two side-by-side displays on the AR device display is disclosed. The two-dimensional image is imaged to form a virtual stereoscopic three-dimensional image. Further, each lens group of the AR device includes a main lens, a first tunable lens for correcting spherical refractive error in the user's far vision, and a second tunable lens for correcting astigmatism.

In yet another example scenario, a virtual or head-mounted device is provided. The head-mounted device includes a frame. The frame includes opposing arm members, a bridge portion positioned intermediate between the opposing arm members, and a pair of virtual or augmented reality eyepieces, each having an optical center, the pair of virtual or augmented reality eyepieces movable to the frame to allow adjustment of the interpupillary distance between the optical centers.

However, all wearable devices and computing units, as in the examples mentioned above, are bulky since computing units, sensors, and powerful batteries. Also, the battery life needs to be all-day and the form factor of the device needs to be light and ergonomic for all-day use. Computing consumes batteries and generates heat. This makes it difficult to make all-day wearables, especially where video processing/streaming is involved.

Therefore, there is a need for a solution that shifts the computing load from a wearable device to the device electronically coupled to the wearable device and enables a secure communication network to overcome the aforementioned limitation, in addition to providing other technical advantages.

SUMMARY

Various embodiments of the present disclosure provide a distributed body area network (BAN) system, method, and computer program product for capturing and processing data signals (e.g., bio-signals) and rendering various feedback signals to a user.

In an embodiment, a distributed body area network (BAN) system. The distributed body area network (BAN) system includes at least one wearable device. The at least one wearable device includes a plurality of sensors, a processing module and a communication module. The plurality of sensors is configured to generate sensory data including at least one of user behavioral and physiological parameters, health parameters of a user, ambient parameters, and environmental data. The processing module is configured to perform a set of executable instructions to at least generate a data packet including the sensory data based at least on one or more data packet generation techniques. The communication module is configured to establish a secure communication network with at least one computing device associated with the user using a human body area. The generated data packet is transmitted to the at least one computing device using the established secure communication network. Further, the distributed body area network (BAN) system includes the at least one computing device associated with the user and communicably coupled to the at least one wearable device via the secure communication network. The at least one computing device includes a memory storing executable instructions and a processor operatively coupled with the memory. The processor is configured to execute the executable instructions to cause the at least one computing device to receive the data packet including the sensory data from the at least one wearable device via the secure communication network. The transmission of the data packet between the at least one wearable device and the at least one computing device corresponds to human body communication (HBC). The processor further generates a data model corresponding to each of the user behavioral and physiological parameters, the health parameters of the user, the ambient parameters, and the environmental data appended in the data packet based at least on applying one or more data processing models. Further, the processor transmits the data model to the at least one wearable device via the secure communication network. The at least one wearable device executes one or more instructions appended in the data model to at least render the sensory data for visualization to the user, and provide a stimulation to the user.

In another embodiment, a method performed by a distributed body area network (BAN) system is disclosed. The method includes generating sensory data including user behavioral and physiological parameters, health parameters of the user, ambient parameters, and environmental data from a plurality of sensors of at least one wearable device. The method includes generating a data packet including the sensory data based, at least in part, on one or more data packet generation techniques. Further, the method includes transmitting, by the at least one wearable device, the data packet including the sensory data to at least one computing device via a secure communication network. The secure communication network facilitating transmission of the data packet from the at least one wearable device and the at least one computing device correspond to human body communication (HBC). The method further includes generating and transmitting, by the at least one computing device, a data model corresponding to each of the user behavioral and physiological parameters, the health parameters of the user, the ambient parameters, and the environmental data appended in the data packet to the at least one wearable device based at least on applying one or more data processing models. The method includes executing by the at least one wearable device one or more instructions appended in the data model to at least render the sensory data for visualization to the user and provide stimulation to the user.

In yet another embodiment, a computer program product including a sequence of instructions stored in a non-transitory computer-readable medium, executable by at least one processor causes the at least one processor to perform a method including generating sensory data including user behavioral and physiological parameters, health parameters of the user, ambient parameters, and environmental data from a plurality of sensors. The method includes generating a data packet including the sensory data based, at least in part, on one or more data packet generation techniques. Further, the method includes transmitting the data packet including the sensory data to at least one computing device via a secure communication network. The transmission of the data packet corresponds to human body communication (HBC). The method further includes transmitting a data model corresponding to each of the user behavioral and physiological parameters, the health parameters of the user, the ambient parameters, and the environmental data appended in the data packet based at least on applying one or more data processing models. The method includes executing one or more instructions appended in the data model to at least render the sensory data for visualization to the user, and provide stimulation to the user.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1A:
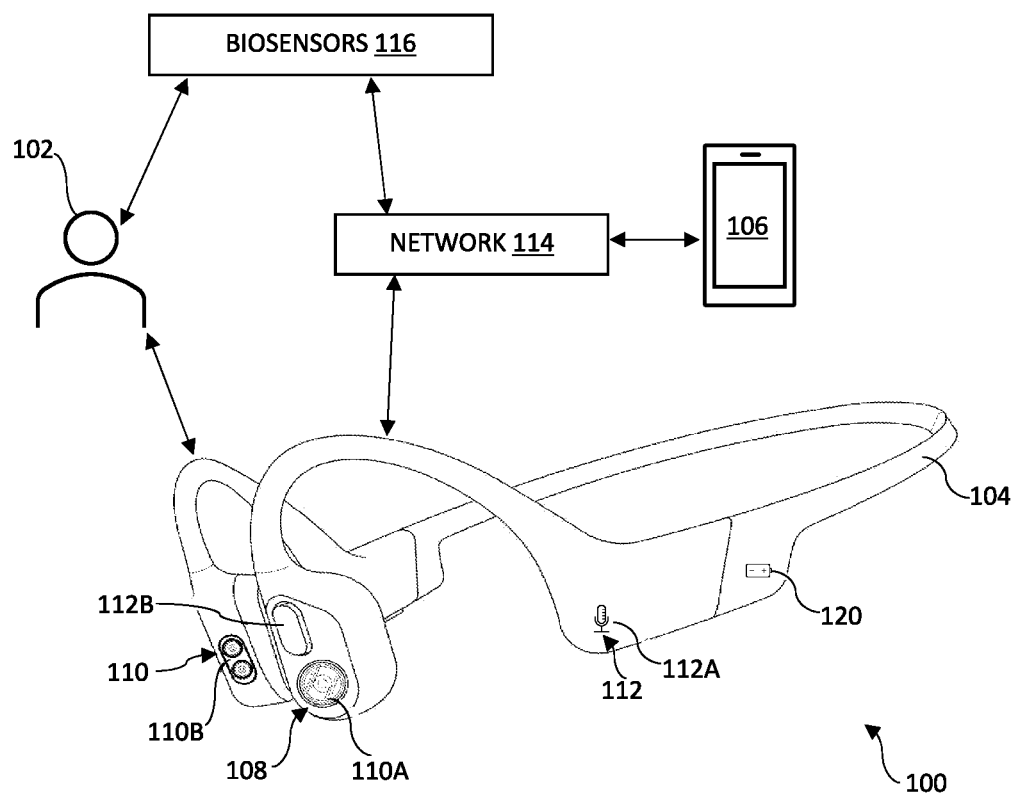
FIGS. 1A and 1B illustrate an example representation of an environment related to at least some example embodiments of the present disclosure.

The drawings referred to in this description are not to be understood as being drawn to scale except if specifically noted, and such drawings are only exemplary in nature.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration". Any embodiment or implementation of the present subject matter described herein as "exemplary" is not necessarily to be construed as preferred or advantageous over other embodiments. The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment", "in an exemplary embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting. A computer system (standalone, client, or server, or computer-implemented system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations. Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Referring now to the drawings, and more particularly to FIGS. 1A and 1B through FIG. 4, where similar reference characters denote corresponding features consistently throughout the figures, there are shown preferred embodiments and these embodiments are described in the context of the following exemplary system and/or method.

Figure 1B:
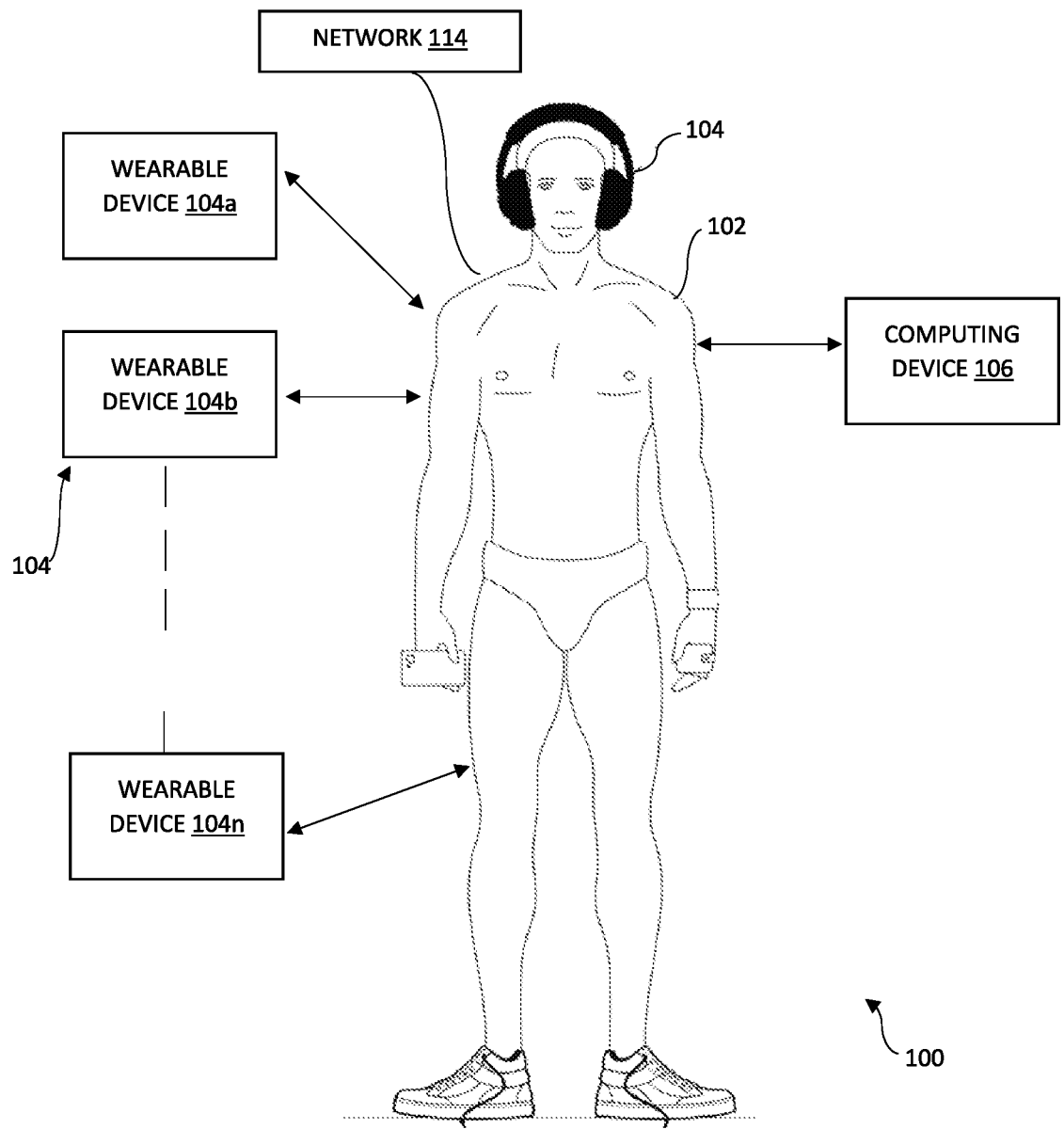

FIGS. 1A and 1B illustrate an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 relates to a distributed body area network (BAN). The environment 100 (hereinafter interchangeably referred to as 'the distributed BAN 100") includes a user 102, at least one wearable device 104 (collectively referred to a wearable device 104a, a wearable device 104b, . . . a wearable device 104n), and at least one computing device 106. The computing device 106 is capable of connecting to a communication network, such as the network 116, for communicating with the wearable device 104. Some non-limiting examples of the computing device 106 may include a laptop computer, a smartphone, a desktop computer, a workstation terminal, a personal digital assistant, or in general, any computing device capable of Web access.

The wearable device 104 is exemplarily depicted as a head-mounted display (HMD) device. Some non-limiting examples of the wearable device 104 may include an augmented reality (AR) device, a virtual reality (VR) device, and a mixed reality (MR) device. The wearable device 104 renders virtual environments to the user 102, thereby allowing the user 102 to interact with and experience computer-generated worlds in a three-dimensional (3D) space. Further, the wearable device 104 is uniquely designed to consolidate more processing power into a smaller unit. In other words, the wearable device 104 has a compact and lightweight design allowing the user 102 to wear it as over the ear headset. In the illustrated embodiment, the wearable device 104 may be a standalone component and/or communicate bio signals with external devices such as the computing device 106 which will be explained further in detail.

The wearable device 104 includes a plurality of sensors 108. The sensors 108 may include, but are not limited to, a plurality of image sensors 110, at least one audio device 112, and one or more biosensors 116. The image sensor 110 may include a first image sensor 110A and a second image sensor 110B. The first image sensor 110A is mounted to an outer side surface of each arm of the wearable device 104. The second image sensor 110B is mounted to an outer front surface of each arm of the wearable device 104. Some examples of the image sensor 110 may include at least a digital camera, a depth camera, a neuromorphic event-driven camera, and Light Detection and Ranging (LiDAR). Further, the audio device 112 may include a microphone 112A, a speaker 112B, and the like. Furthermore, the biosensors 116 may include at least Electroencephalogram (EEG) sensors and Electromyogram (EMG) sensors. The wearable device 104 includes a power source 120. The power source 120 is configured to provide one of an alternating current output and a direct current output to components of the wearable electronic device 104.

The plurality of sensors 108 is configured to generate sensory data including user behavioral and physiological parameters, health parameters of the user 102, ambient parameters, and environmental data. Specifically, the wearable device 104 includes a processing module configured to execute a set of executable instructions to perform one or more operations described herein. The processing module transmits a control signal to the plurality of sensors 108 to generate the sensory data.

Upon receipt of the control signal, the image sensors 110 including the first image sensor 110A and the second image sensor 110B capture real-time image data of the surrounding environment of the user 102 within a field of view (FOV) associated with the first and second image sensors 110A; 110B. For example, the FOV of the image sensors 110A; 110B may be 270-degree view. It is to be noted that the first image sensor 110A is configured to capture real-time image data of a left-side view and a right-side view of the surrounding environment of the user 102. Further, the second image sensor 110B captures real-time image data of a front view of the surrounding environment of the user 102. Furthermore, the microphone captures audio signals in the vicinity of the user 102 in real-time. The processing module may be configured to generate the environmental data by synchronizing the real-time audio signals and the real-time image data captured by image sensors 110. In an embodiment, the wearable device 104 may include an auxiliary image sensor (not shown in Figures). The wearable device 104 is configured to visualize image data being captured by the auxiliary image sensor. The image data includes a morphology of the user 102.

Further, the biosensors 116 are configured to determine the user behavioral and physiological parameters, and the health parameters of the user upon receipt of the control signal from the processing module. The health parameters may include, but are not limited to, a heart rate and a body temperature value. In this embodiment, the electrocardiogram (ECG) sensor is capable of performing simple tests to check the heart's rhythm and electrical activity. These sensors are commonly used in medical settings for diagnosing various heart conditions and monitoring cardiac health. Further, the EMG sensor is capable of a diagnostic procedure to assess the health of muscles and the nerve cells that control them (motor neurons). The EMG results can reveal nerve dysfunction, muscle dysfunction or problems with nerve-to-muscle signal transmission, among others. In other words, the EMG sensor is used to measure and record the electrical activity produced by muscles during contraction and relaxation. These sensors are commonly used in medical diagnostics, rehabilitation, biomechanics research, and human-computer interaction. In addition, the sensors 108 are configured to determine ambient parameters of the user 102 as explained above. The ambient parameters may include, but are not limited to, an ambient temperature value and a humidity value.

Thereafter, the processing module generate a data packet including the sensory data (such as the user behavioral and physiological parameters, the health parameters, the ambient parameters, and the environmental data) based at least on one or more data packet generation techniques. In general, by properly formatting and organizing data into the data packet, seamless communication across diverse network environments is made possible. The data packet generation techniques refer to methods used to create packets of data for transmission over a network 114. In other words, the data packet generation techniques play a critical role in ensuring efficient, reliable, and secure transmission of the sensory data over networked systems (such as the computing device 106 and the wearable device 104).

In particular, the wearable device 104 includes a communication module (not shown in Figures). The communication module is configured to establish a secure communication network (such as the network 114) with the computing device 106 associated with the user 102 using a human body area. The generated data packet is transmitted from the wearable device 104 to the computing device 106 using the established secure communication network 114. It is to be noted that the transmission of the data packet between the wearable device 104 and the at least one computing device 106 corresponds to human body communication (HBC). In other words, the wearable device 104 is capable of sending the sensory data directly through the body electro-quasistatic human-body communication. In an embodiment, the data packet is transmitted from the wearable device 104 to the computing device 106 in the form of electro-quasistatic signals (EQS).

It is known that water filled with conductive particles like electrolytes and salts conducts electricity better. The human body is filled with a watery solution called the interstitial fluid that sits underneath the skin and around the cells of the body. The interstitial fluid is responsible for carrying nutrients from the bloodstream to the body's cells, and is filled with proteins, salts, sugars, hormones, neurotransmitters, and all sorts of other molecules that help keep the body going. As a result, the interstitial fluid in the user's body (i.e., the user 102) allows the establishment of a circuit between two or more communicating devices (wearable device 104 and the computing device 106) located anywhere on the body. Further, it is to be noted that the secure communication network 114 is a network infrastructure that protects the confidentiality, integrity, and availability of data transmitted between connected devices (i.e., the wearable device 104 and the computing device 106). In addition, the secure communication network 114 safeguards sensitive information, prevents unauthorized access and mitigates cybersecurity threats.

In an embodiment, the wearable device 104 may include a Bluetooth card, a network interface card, or near field communication card to wirelessly connect with the user's device (e.g., the computing device 106) to send the sensory data to the computing device 106 for further processing which will be explained further in detail. Alternatively, the wearable device 104 and the computing device 106 may be communicably coupled using wired networks, wireless networks, or any other personal area network communication technology, and combinations thereof. Some non-limiting examples of the wired networks may include Ethernet, local area networks (LANs), fiber-optic networks, and the like. Some non-limiting examples of wireless networks may include cellular networks, wireless LANs, Wi-Fi or ZigBee networks, and the like.

Further, the computing device 106 may include at least one processor. The processor of the computing device 106 receives the data packet appended with the sensory data from the wearable device 104 via the secure communication network 114. As explained above, the data packet is transmitted in the form of electro-quasistatic signals (EQS). Thereafter, the computing device 106 generates a data model corresponding to each of the user behavioral and physiological parameters, the health parameters of the user 102, the ambient parameters, and the environmental data appended in the data packet. Specifically, the computing device 106 generates the data model based at least on applying one or more data processing models. The data processing models comprise at least an artificial intelligence (AI) model. In general, the data processing models define the steps, methodologies, and techniques involved in processing data to achieve specific objectives, such as analysis, transformation, storage, or visualization which will be explained further in detail. The data processing models may include individual AI model(s) for processing the behavioral and physiological data of the user 102. Processing the behavioral and physiological data may include, but is not limited to, parameter extraction, feature extraction, and the like. Further, the data processing models may include individual AI model(s) to process voice data, render video feed, and the like.

Thereafter, the computing device 106 transmits the data model to the wearable device 104 via the secure communication network 114. The wearable device executes one or more instructions appended in the data model to at least render the sensory data for visualization to the user 102 and provide stimulation to the user 102. The wearable device 104 (e.g., a camera headset) captures the video of what the user 102 sees and streams the data to the computing device 106. The computing device 106 processes the data and alerts or gives feedback to the user 102. For example, a biker with a camera streaming video. The computing device 106 can process the video and alert a biker via a voice prompt when there is a car dangerously close to him/her.

In one scenario, the one or more instructions include alert instructions to at least actuate at least one audio device 112, provide vibrational feedback, and a neurostimulation trigger. The wearable device 104 typically performs an actuation and/or feedback corresponding to the alert instructions. The actuation and/or feedback may be the speaker activation, bone conduction, or vibration. In another scenario, the one or more instructions include visual instructions to render the sensory data in the wearable device 104 for visualization to the user 102. The wearable device 104 may render the sensory data in an immersive 3D environment or multimedia content to the user 102, in response to receipt of the visual instructions.

In an embodiment, the wearable device 104 receives the health parameters for example, including an insulin level of the user 102 from a wearable device (for example, a wearable device 104b). The wearable device 104b may be an insulin measuring equipment. The insulin level is encoded in the form of a series of voltage values. The wearable device 104b receives the health parameters including the insulin level by applying a voltage between a first electrode and a second electrode of the wearable device 104b. The first electrode is in contact with the user 102 and the second electrode is connected to an electrical ground point. In other words, using an insulin pump, the pump and the monitor of the insulin measuring equipment(or the wearable device 104b) would each be outfitted with an electrode (e.g., the first electrode) on its back (e.g., copper), in direct contact with the skin. Each of the aforementioned devices includes the second electrode not in contact with the skin but functions as a sort of floating ground i.e., a local electrical ground that is not directly connected with Earth's ground. When the monitor takes a blood glucose measurement, it will need to send that data to both the pump, in case the insulin level needs to be adjusted, and to the wearable device 104b, so that the user 102 can see the level. The wearable device 104b may store data for long-term monitoring or encrypt it and send it to an external device (e.g., a computer) for remote storage and analysis.

As explained above, the wearable device 104b receives the health parameters including the insulin level of the user 102. Thereafter, the wearable device 104b generates the data packet by encoding the insulin level in the form of the series of voltage levels. In particular, the monitor of the insulin measuring equipment (or the wearable device 104b) communicates the glucose measurements by encoding the data into the series of voltage values. Then, the insulin measuring equipment transmits the results by applying a voltage between its two copper electrodes i.e., the first electrode touching the user's body (i.e., the user 102), and the second electrode acting as the floating ground. This applied voltage very slightly changes the potential of the entire body of the user 102 relative to Earth's ground. As both the pump on the waist and wearable device 104 of the user 102 are on the body, they can detect this change in potential across the first and second electrodes. The pump and the wearable device 104b then convert the potential measurements back into machine-readable data (or the data packet), without the actual signal ever traveling beyond the skin.

Further, the wearable device 104b transmits the data packet to the computing device 106 via the secure communication network 114. Similarly, the computing device 106 generates the data model corresponding to the health parameters appended in the data packet and transmits the data model to the wearable device 104b. The wearable device 104b executes the one or more instructions (including the alert instructions and/or the visual instructions) appended in the data model to render the health parameters (i.e., the insulin level) for visualization to the user 102, and provide stimulation to the user 102.

The number and arrangement of systems, devices, and/or networks shown in FIGS. 1A and 1B are provided as an example. There may be other systems, devices, and/or networks; fewer systems, devices, and/or networks; different systems, devices, and/or networks, and/or differently arranged systems, devices, and/or networks than those shown in FIGS. 1 and 1B.

Though few components and subsystems are disclosed in FIGS. 1A and 1B, there may be additional components and subsystems which is not shown, such as, but not limited to, ports, routers, repeaters, firewall devices, network devices, databases, network attached storage devices, user devices, additional processing systems, servers, assets, machineries, instruments, facility equipment, any other devices, and combination thereof. The person skilled in the art should not be limiting the components/subsystems shown in FIGS. 1A and 1B. Although FIGS. 1A and 1B illustrates the system 100, is connected to the wearable device 104, a bio sensor 116 and a computing device 106, one skilled in the art may envision that the system 100, may be connected to several wearable devices 104, biosensors 116 and the computing device 106 located at same/different locations.

Those of ordinary skilled in the art will appreciate that the hardware depicted in FIGS. 1A and 1B may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Figure 2:
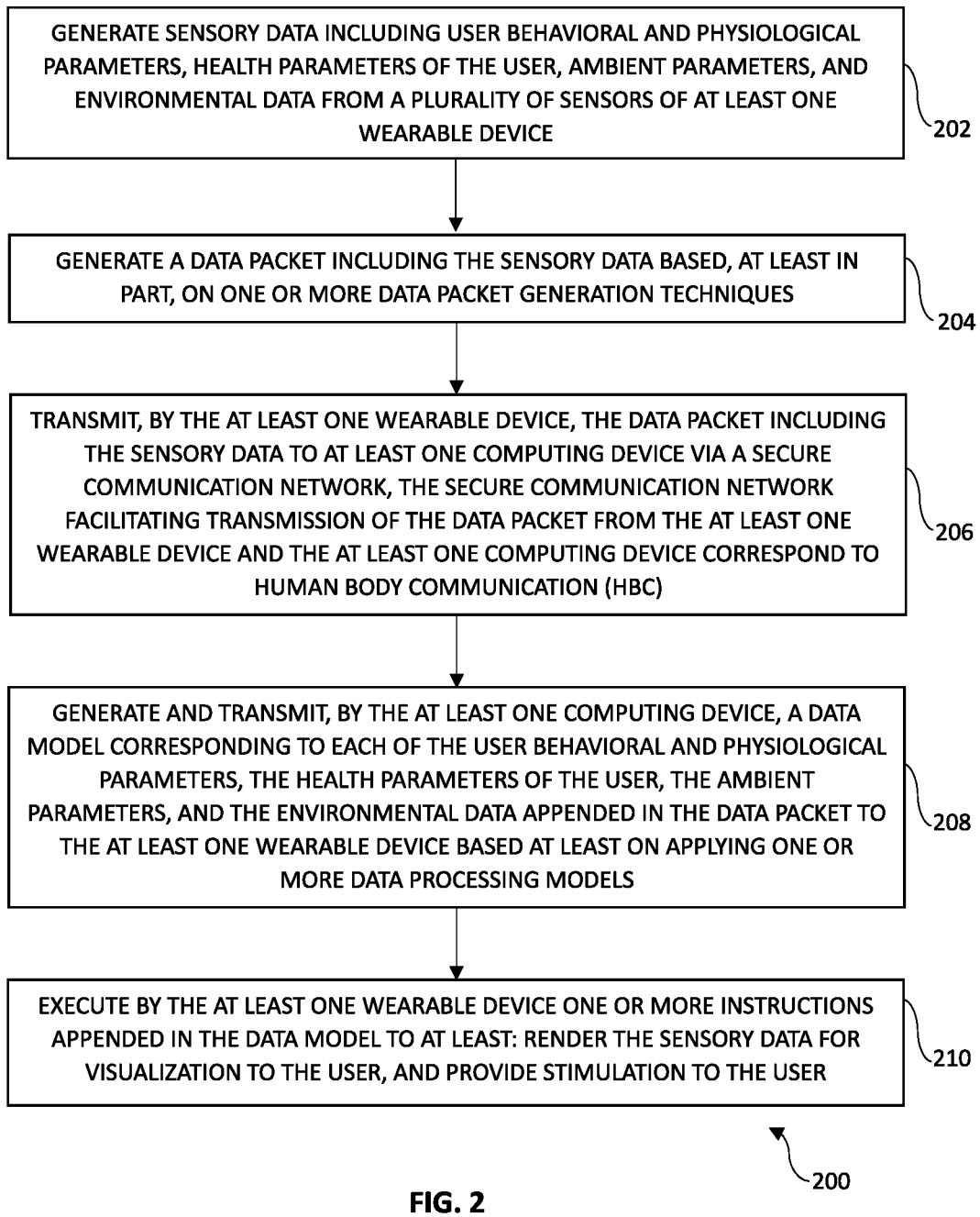
FIG. 2 illustrates a flow diagram of a method performed by a distributed body area network (BAN) system, in accordance with an embodiment of the present disclosure.

FIG. 2 illustrates a flow diagram of a method 200 performed by the distributed body area network (BAN) system 100, in accordance with an embodiment of the present disclosure. The method 200 depicted in the flow diagram may be executed by, for example, the processor module of the BAN system 100. It is noted that the operations of the method 200 can be described and/or practiced by using a system other than these BAN systems. The method 200 starts at operation 202.

At operation 202, the method 200 includes generating sensory data including user behavioral and physiological parameters, health parameters of the user, ambient parameters, and environmental data from the plurality of sensors 108 of the wearable device 104. The wearable device 104 corresponds to a head-mounted device. Further, the wearable device 104 may include, for example, one of an augmented reality (AR) device, a virtual reality (VR) device, and a mixed reality (MR) device. Furthermore, the plurality of sensors 108 may include image sensors 110, the at least one audio device 112, and the one or more biosensors 116.

At operation 204, the method 200 includes generating, by the wearable device 104, a data packet by appending the sensory data based, at least in part, on one or more data packet generation techniques.

At operation 206, the method 200 includes transmitting, by the wearable device 104, the data packet including the sensory data to the at least one computing device via the secure communication network 114. The secure communication network facilitating transmission of the data packet from the wearable device and the at least one computing device correspond to human body communication (HBC). In an embodiment, the data packet is transmitted from the wearable device 104 to the computing device 106 in the form of electro-quasistatic signals (EQS).

At operation 208, the method 200 includes generating and transmitting, by the at least one computing device 106, a data model corresponding to each of the user behavioral and physiological parameters, the health parameters of the user 102, the ambient parameters, and the environmental data appended in the data packet to the wearable device 104 based at least on applying one or more data processing models. The one or more data processing models include at least an artificial intelligence (AI) model. For example, a computer vision model processing the video of what the user 102 is seeing to explain to a blind person what is in their field of view is implemented by the AI model.

At operation 210, the method 200 includes executing by the wearable device 104 one or more instructions appended in the data model to at least render the sensory data for visualization to the user 102, and provide stimulation to the user 102. The one or more instructions include alert instructions and visual instructions. The alert instructions actuate the at least one audio device 112, provide vibrational feedback, and a neurostimulation trigger. The visual instructions render the sensory data in the wearable device 104 for visualization to the user 102. Further, the one or more operations performed by the distributed BAN system 100 are already explained with references to FIG. 1, and therefore they are not reiterated, for the sake of brevity.

Figure 3:
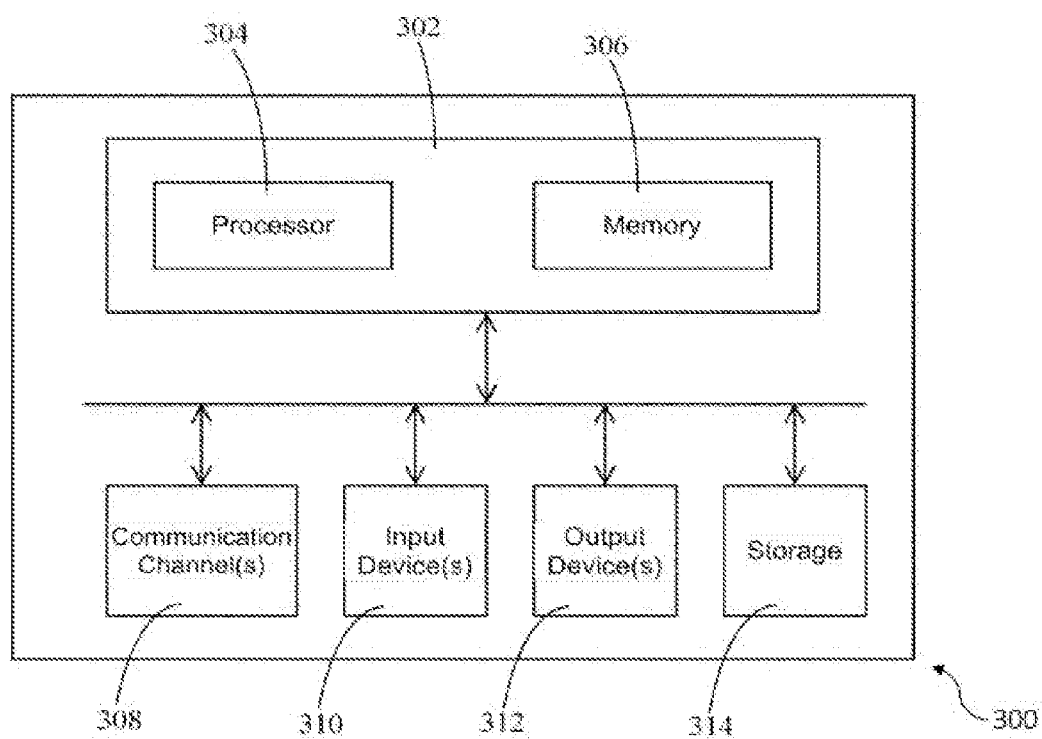
FIG. 3 illustrates a simplified block diagram representation of an electronic device, in accordance with an embodiment of the present disclosure.

FIG. 3 illustrates a simplified block diagram representation 300 of an electronic device 300, in accordance with an embodiment of the present disclosure. The electronic device 300 can be implemented as the wearable device 104 and the at least one computing device 106 of FIG. 1. The electronic device 300 includes a computer system 302. The computer system 302 includes one or more processors 304 and at least one memory 306. The processor 304 is configured to execute program instructions. For example, the processor 304 may be a real processor or a virtual processor. It will be understood that the computer system 302 does not suggest any limitation as to the scope of use or functionality of the described embodiments. The computer system 302 may include, but is not limited to, one or more of a general-purpose computer, a programmed microprocessor, a microcontroller, an integrated circuit, and other devices or arrangements of devices that are capable of implementing the steps that constitute the methods of the present invention.

Exemplary embodiments of the computer system 302 in accordance with the present invention may include one or more servers, desktops, laptops, tablets, smartphones, mobile phones, mobile communication devices, tablets, phablets, and personal digital assistants. In an embodiment, the memory 306 may store software for implementing various embodiments of the present invention. The computer system 302 may include additional components or fewer components. For example, the computer system 302 may include one or more communication channels 308, one or more input devices 310, one or more output devices 312, and a storage 314. An interconnection mechanism (not shown) such as a bus, control circuitry, or network, interconnects the components of the computer system 302. In various embodiments, operating system software (not shown) provides an operating environment for various software(s) executing in the computer system 302 using a processor 304 and manages different functions and features of the components of the computer system 302.

The communication channel(s) 308 is an example of the communication network 114. The communication channel(s) 308 allows communication over a communication medium to various other computing entities. The communication medium provides information such as program instructions, or other data in a communication medium. The communication media may include, but are not limited to, wired or wireless methodologies implemented with electrical, optical, RF, infrared, acoustic, microwave, Bluetooth, IEEE 802.15.6, IEEE 802.15.4, IEEE 802.15.3 compliant networking protocols, or other transmission media.

The input device(s) 310 may include, but are not limited to, a touch screen, a keyboard, mouse, pen, joystick, trackball, a voice device, a scanning device, or any other device that is capable of providing input to the computer system 302. In an embodiment of the present invention, the input device(s) 310 may be a sound card or similar device that accepts audio input in analog or digital form. The output device(s) 312 may include, but not be limited to, a user interface on CRT, LCD, LED display, or any other display associated with any of servers, desktops, laptops, tablets, smartphones, mobile phones, mobile communication devices, tablets, phablets and personal digital assistants, printer, speaker, CD/DVD writer, or any other device that provides output from the computer system 302.

The storage 314 may include, but not be limited to, magnetic disks, magnetic tapes, CD-ROMs, CD-RWs, DVDs, any types of computer memory, magnetic stripes, smart cards, printed barcodes, or any other transitory or non-transitory medium which can be used to store information and can be accessed by the computer system 302. In various embodiments, the storage 314 may contain program instructions for implementing any of the described embodiments.

In an embodiment, the computer system 302 is part of a distributed network or a part of a set of available cloud resources.

In an embodiment, the present invention may be applicable to any such wearable compute apparatus, including a plurality of sensors, but whose processing power is in a separate computing device near the device in a boy area network. To further illustrate, the utility advantage of this implementation is that the wearable device becomes as lightweight as it does.

The present invention may be implemented in numerous ways including as a system, a method, or a computer program product such as a computer readable storage medium or a computer network wherein programming instructions are communicated from a remote location.

In some aspects, the present invention may suitably be embodied as a computer program product for use with the computer system 302. The method described herein is typically implemented as a computer program product, comprising a set of program instructions that is executed by the computer system 302 or any other similar device. The set of program instructions may be a series of computer-readable codes stored on a tangible medium, such as a computer readable storage medium (i.e., the storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Working Example of the Disclosure

Figure 4:
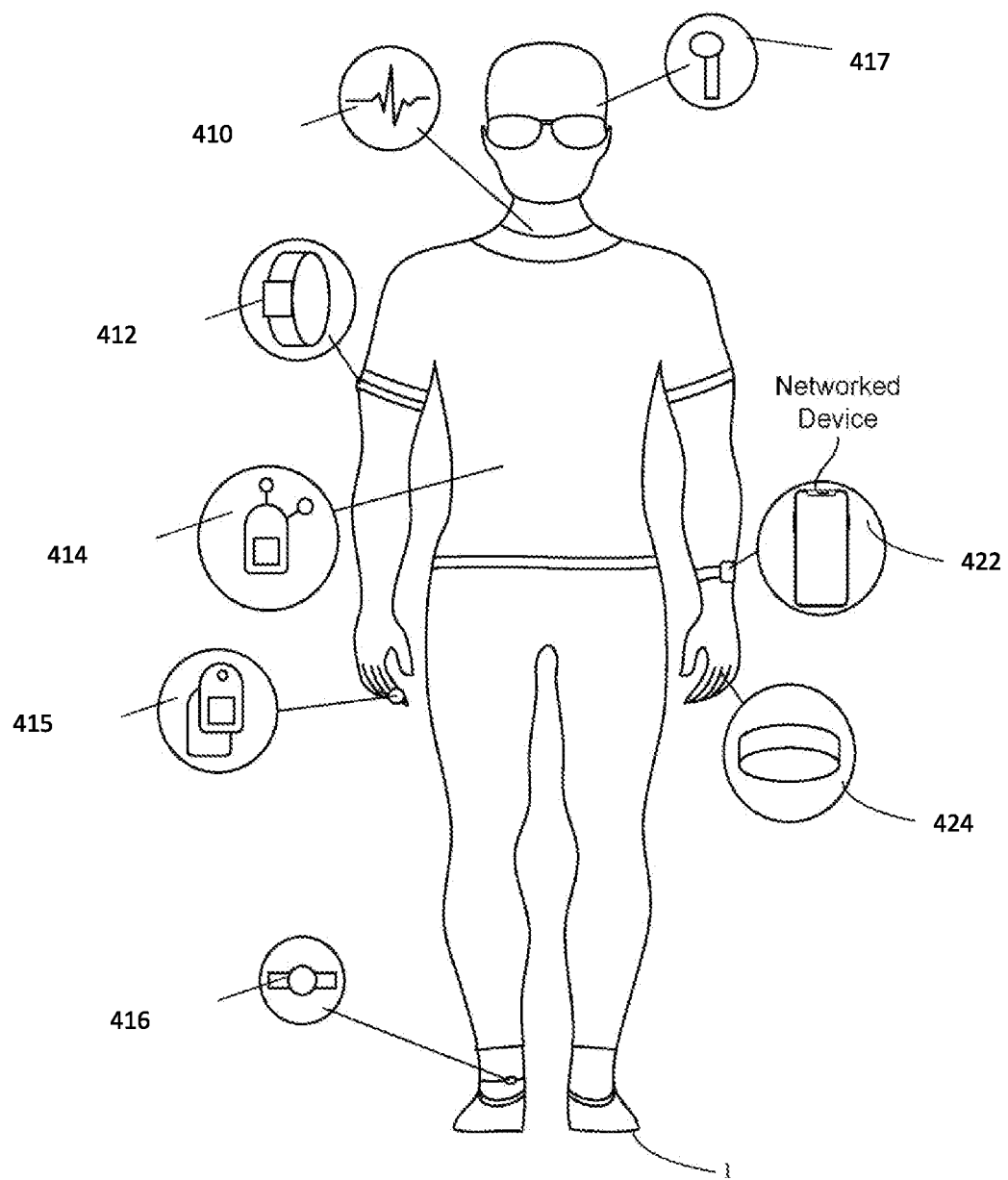
FIG. 4 illustrates an example representation of a system comprising a plurality of sensors coupled to a computing device of higher processing power, including a body area network in accordance with an embodiment of the present disclosure.

FIG. 4 illustrates an example representation of a system comprising a plurality of sensors coupled to a computing device of higher processing power, comprising a body area network in accordance with an embodiment of the present disclosure. In the figure, it is illustrated a person 1, on whose body is a plurality of sensors 410, 412, 414, 415, 416, 417, and 424. The sensors 410, 412, 414, 415, 416, 417 and 424 are operably coupled to a networked device 422 of higher processing power, the device being located on or in close proximity to the body. For the avoidance of doubt, the sensors 410, 412, 414, 415, 416, 417 and 424 may include any such measuring devices worn on the body or placed inside the body such as but not limited to smart-watches, heart monitors, insulin sensors, glucose sensors, woven activity sensors, hydration sensors, non-woven activity sensors, or the like. The sensors 410, 412, 414, 415, 416, 417 and 424 may be adapted to share data with a coupled computing device via using wireless techniques, including but not limited to microwave, infrared, Bluetooth or other transmission techniques.

The present disclosure solves the problem of shifting the computing load from at least one wearable device associated with a user to the device electronically coupled to the at least one wearable device and enables a secure communication network with increased performance efficiency.

Various embodiments of the present invention offer multiple advantages and technical effects. Without limiting the scope of the invention, the present disclosure discloses a BAN system with at least one wearable device and at least one computing device. The compute resources (or the data packet) from all the wearable devices are shared with the computing device for computational tasks. This provides increased battery life (or performance efficiency) of the wearable device for sharing the ambient parameters or the parameters related to the user in real-time. Also, the computing device acts as a wearable hub for performing all the computational tasks upon receipt of the compute resources from the at least one wearable device, thereby reducing a number of computing devices associated with the user. Furthermore, the wearable device does not require to compress the data before transmission as the data is being transmitted via a human body network, which requires very less compute power as compared to existing communication technologies such as Bluetooth, and the like.

Although a preferred embodiment of the present invention has been described for illustrative purposes, those skilled in the art will appreciate that various modifications, additions and substitutions are possible, without departing from the scope and spirit of the invention as disclosed in the accompanying claims. Such alterations are herewith anticipated.

One of the ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, a. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a", "an", and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited, of the scope of the invention, which is outlined in the following claims.

What is claimed is:

1. A distributed body area network (BAN) system, comprising:
   at least one wearable device, comprising:
      a plurality of sensors configured to generate sensory data comprising at least one of user behavioral and physiological parameters, health parameters of a user, ambient parameters, and environmental data,
      a processing module configured to perform a set of executable instructions to at least generate a data packet comprising the sensory data based, at least in part, on one or more data packet generation techniques;
      a communication module configured to establish a secure communication network with at least one computing device associated with the user using a human body area, wherein the generated data packet is transmitted to the at least one computing device using the established secure communication network; and
   the at least one computing device associated with the user communicably coupled to the at least one wearable device via the secure communication network, the at least one computing device comprising:
      a memory storing executable instructions, and
      a processor operatively coupled with the memory, the processor configured to execute the executable instructions to cause the at least one computing device to:
         receive the data packet comprising the sensory data from the at least one at least one wearable device via the secure communication network, wherein the transmission of the data packet between the at least one wearable device and the at least one computing device corresponds to human body communication (HBC);
         generate a data model corresponding to each of the user behavioral and physiological parameters, the health parameters of the user, the ambient parameters, and the environmental data appended in the data packet based at least on applying one or more data processing models, and
         transmit the data model to the at least one wearable device via the secure communication network, wherein the at least one wearable device executes one or more instructions appended in the data model to at least:
            render the sensory data for visualization to the user, and
            provide a stimulation to the user.

2. The BAN system of claim 1, wherein the plurality of sensors of the at least one wearable device comprises a plurality of image sensors, at least one audio device, and one or more biosensors.

3. The BAN system of claim 1, wherein the at least one wearable device corresponds to a head-mounted device, and wherein the at least one wearable device comprises one of an augmented reality (AR) device, a virtual reality (VR) device, and a mixed reality (MR) device.

4. The BAN system of claim 1, wherein the one or more data processing models comprise at least an artificial intelligence (AI) model.

5. The BAN system of claim 2, wherein the plurality of image sensors comprise at least a digital camera, a depth camera, a neuromorphic event-driven camera, and Light Detection and Ranging (LiDAR).

6. The BAN system of claim 5, wherein the plurality of image sensors comprise:
   a first image sensor mounted to an outer side surface of each arm of the at least one wearable device,
   a second image sensor mounted to an outer front surface of each of the at least one wearable device,
   wherein the first image sensor and the second image sensor are configured to capture real-time image data of the surrounding environment of the user within a field of view (FOV) associated with the first and second image sensor.

7. The BAN system of claim 6, wherein the first image sensor is configured to capture real-time image data of a left-side view and a right-side view, and the second image sensor is configured to capture real-time image data of a front view of the surrounding environment of the user.

8. The BAN system of claim 1, wherein the at least one audio device is configured to at least:
   capture audio signals in the vicinity of the user in real-time, and
   reproduce the audio signals in real-time by processing the audio signals, wherein the real-time audio signals and real-time image data captured by a plurality of image sensors of the plurality of sensors are collated to generate the environmental data.

9. The BAN system of claim 1, wherein the at least one wearable device further comprises an auxiliary image sensor, and wherein the at least one wearable device is configured to visualize image data being captured by the auxiliary image sensor, the image data comprising a morphology of the user.

10. The BAN system of claim 1, wherein the one or more biosensors comprise at least one of Electroencephalogram (EEG) sensors and Electromyogram (EMG) sensors, and wherein the one or more biosensors are configured to determine the user behavioral and physiological parameters, and the health parameters of the user, and wherein the health parameters comprise a heart rate and a body temperature value.

11. The BAN system of claim 1, wherein the plurality of sensors of the at least one wearable device is configured to determine ambient parameters of the user, and wherein the ambient parameters comprise an ambient temperature value and a humidity value.

12. The BAN system of claim 1, wherein the one or more instructions comprise alert instructions to at least actuate the at least one audio device, provide vibrational feedback, and a neurostimulation trigger.

13. The BAN system of claim 1, wherein the one or more instructions comprise visual instructions to render the sensory data in the at least one wearable device for visualization to the user.

14. The BAN system of claim 1, wherein the at least one wearable device is configured to at least:
   capture the health parameters comprising an insulin level of the user from, wherein the insulin level is encoded in the form of a series of voltage values, and
   wherein the at least one wearable device receives the health parameters comprising the insulin level based, at least in part, on applying a voltage between a first electrode and a second electrode of the at least one wearable device, wherein the first electrode is in contact with the user and the second electrode is connected to an electrical ground point;
   generate the data packet comprising the insulin level encoded in the form of the series of voltage levels; and
   transmit the data packet to the at least one computing device via the secure communication network.

15. A method performed by a distributed body area network (BAN) system, comprising:
- generating sensory data comprising user behavioral and physiological parameters, health parameters of the user, ambient parameters, and environmental data by a plurality of sensors of at least one at least one wearable device;
- generating a data packet comprising the sensory data based, at least in part, on one or more data packet generation techniques;
- transmitting, by the at least one wearable device, the data packet comprising the sensory data to at least one computing device via a secure communication network, the secure communication network facilitating transmission of the data packet from the at least one wearable device and the at least one computing device correspond to human body communication (HBC);
- generating and transmitting, by the at least one computing device, a data model corresponding to each of the user behavioral and physiological parameters, the health parameters of the user, the ambient parameters, and the environmental data appended in the data packet to the at least one wearable device based at least on applying one or more data processing models; and
- executing, by the at least one wearable device, one or more instructions appended in the data model to at least:
- render the sensory data for visualization to the user, and provide stimulation to the user.

16. The method of claim 15, wherein the at least one wearable device corresponds to a head-mounted device, and wherein the at least one wearable device comprises one of an augmented reality (AR) device, a virtual reality (VR) device, and a mixed reality (MR) device.

17. The method of claim 15, wherein the plurality of sensors comprises a plurality of image sensors, at least one audio device, and one or more biosensors.

18. The method of claim 15, wherein the one or more data processing models comprise at least an artificial intelligence (AI) model.

19. The method of claim 15, wherein the one or more instructions comprise alert instructions and visual instructions, the alert instructions actuate the at least one audio device, provide vibrational feedback, and a neurostimulation trigger, and the visual instructions render the sensory data in the at least one wearable device for visualization to the user.

20. A non-transitory computer readable medium comprising a sequence of instructions, that when executed by at least one processor cause the at least one processor to perform a method comprising:
- generating sensory data comprising user behavioral and physiological parameters, health parameters of the user, ambient parameters, and environmental data from a plurality of sensors; generating a data packet comprising the sensory data based, at least in part, on one or more data packet generation techniques; transmitting the data packet comprising the sensory data via a secure communication network, the transmission of the data packet correspond to human body communication (HBC); transmitting a data model corresponding to each of the user behavioral and physiological parameters, the health parameters of the user, the ambient parameters, and the environmental data appended in the data packet based at least on applying one or more data processing models; and executing one or more instructions appended in the data model to at least: render the sensory data for visualization to the user, and provide stimulation to the user.

* * * * *